United States Patent
Dhayni

(10) Patent No.: US 9,509,373 B2
(45) Date of Patent: Nov. 29, 2016

(54) METHOD FOR A CONTACTLESS COMMUNICATION BETWEEN TWO NFC DEVICES WITH IMPACT REDUCTION OF AN EXTERNAL NOISE EMISSION

(71) Applicant: STMicroelectronics International N.V, Amsterdam (NL)

(72) Inventor: Achraf Dhayni, Vallauris (FR)

(73) Assignee: STMICROELECTRONICS INTERNATIONAL N.V., Amsterdam (NL)

( * ) Notice: Subject to any disclaimer, the term of this patent is extended or adjusted under 35 U.S.C. 154(b) by 0 days.

(21) Appl. No.: 14/860,188

(22) Filed: Sep. 21, 2015

(65) Prior Publication Data

US 2016/0087681 A1    Mar. 24, 2016

(30) Foreign Application Priority Data

Sep. 22, 2014   (FR) ...................... 14 58904

(51) Int. Cl.
   *H04B 5/00*      (2006.01)
   *H04B 15/02*     (2006.01)
   *H04L 27/08*     (2006.01)

(52) U.S. Cl.
   CPC .......... *H04B 5/0031* (2013.01); *H04B 5/0056* (2013.01); *H04B 5/0068* (2013.01); *H04B 15/02* (2013.01); *H04L 27/08* (2013.01)

(58) Field of Classification Search
   CPC .... H04B 5/0025; H04B 5/0056; H04B 5/00; H04B 5/0031; H04B 15/02; H04B 5/0068; H04L 27/08
   See application file for complete search history.

(56) References Cited

U.S. PATENT DOCUMENTS

| 2008/0036573 | A1  | 2/2008 | Tsukamoto et al. |
| 2011/0125063 | A1* | 5/2011 | Shalon ................. A61B 5/0006 600/590 |
| 2013/0237150 | A1* | 9/2013 | Royston ............... H04B 5/0025 455/41.1 |

FOREIGN PATENT DOCUMENTS

EP          2009790 A1    12/2008

OTHER PUBLICATIONS

Kim, S., et al., "A UHF-band RFID Transmitter with Spur Reduction Technique using a DLL-based Spread-Spectrum Clock Generator," RTUIF-5, IEEE Radio Frequency Integrated Circuits Symposium, Jun. 1, 2014, pp. 393-396.

* cited by examiner

*Primary Examiner* — Ping Hsieh
(74) *Attorney, Agent, or Firm* — Slater Matsil, LLP

(57) ABSTRACT

A system can be used for contactless communication of information between a first device and a second device, each having an antenna intended to be coupled via a near magnetic field. The first device includes a transmit chain having first circuitry configured to generate a digital data stream corresponding to the information to be transmitted, and second circuitry configured to generate a first amplitude-modulated and dithered signal in the antenna of the first device from this stream and from an application of a first dithering. The second device includes a receive chain having third circuitry configured to carry out a frequency transposition of a second amplitude-modulated and dithered signal originating from the first signal, with application of a second dithering synchronous with the first dithering.

33 Claims, 6 Drawing Sheets

METHOD FOR A CONTACTLESS COMMUNICATION BETWEEN TWO NFC DEVICES WITH IMPACT REDUCTION OF AN EXTERNAL NOISE EMISSION

This application claims priority to French Application No. 1458904, filed on Sep. 22, 2014, which application is hereby incorporated herein by reference.

TECHNICAL FIELD

Embodiments of the present invention relate to a method for a contactless communication between two NFC devices with impact reduction of an external noise emission.

BACKGROUND

Near Field Communication, or NFC as it is known to the person skilled in the art, is a wireless connectivity technology which enables a communication over a short distance, for example 10 cm, between electronic devices, such as, for example, contactless chip cards or mobile telephones in card emulation mode, and readers.

NFC technology is particularly suitable for connecting any type of user device and enables fast and simple communications.

A contactless device is a device capable of exchanging information via an antenna with another contactless device, for example a reader, according to a contactless communication protocol.

An NFC device, which is a contactless device, is a device compatible with NFC technology.

NFC technology is an open technological platform standardized in the ISO/IEC 18092 and ISO/IEC 21481 standards, but incorporates many existing standards such as, for example, the type-A and type-B protocols defined in the ISO-14443 standard which may be communication protocols usable in NFC technology.

In addition to its conventional telephony function, a cellular mobile telephone can be used (if it is equipped with specific circuitry) to exchange information with another contactless device, for example a contactless reader, using a contactless communication protocol usable in NFC technology.

This enables information to be exchanged between the contactless reader and secure elements located in the mobile telephone. Many applications are thus possible, such as mobile ticketing in public transport (the mobile telephone acts as a travel ticket) or mobile payment (the mobile telephone acts as a payment card).

Different electronic circuits can be integrated in a compact manner and can jointly occupy the same chip or can coexist on the same device or platform. These circuits share the same substrate, the same signals, the same supply signals and the same clock signal tree structures.

This results in electromagnetic stray coupling which must be taken into account in the integrated circuit design.

Furthermore, the intrinsic non-linearity of active analog and digital devices causes out-of-band interference (mainly high-order harmonics), which causes a severe distortion, particularly in the other wanted analog signals, and also voltage or direct current offset errors on sensitive nodes in the victim circuit, resulting in malfunction of the latter.

SUMMARY

Embodiments of the invention relate to the wireless communication between two devices, for example two NFC ("Near Field Communication") devices, for example a reader and a tag transponder or a contactless chip card or a mobile telephone in card emulation mode, without these examples being limiting, and more particularly the reduction of the impact of noise originating from a third-party device.

An NFC device may coexist on and jointly occupy the same electronic platform with other devices such as radio devices operating in the FM band, GPS and Bluetooth devices and wireless local network stations (WLAN: "Wireless Local Area Network").

Consequently, the NFC device may fall victim to a plurality of interfering noise emissions originating from the electromagnetic coupling with aggressors located on the same chip as the NFC device, such as the FM radio, GPS, Bluetooth or WLAN device.

An electromagnetic coupling of this type may occur between the antenna of the aggressor and the antenna of the NFC device (victim) or between some signals of the aggressor and other signals of the victim, in particular signals which travel over long paths such as the tree structures of clock signals.

The NFC device may also fall victim to noise emissions from an electromagnetic coupling with aggressors located outside the chip on which the NFC device is located, but on the same printed circuit board and the same platform. Aggressors of this type may, for example, be power supply modules, clock signal generators, frequency synthesizers, etc.

Filters generally referred to by the person skilled in the art as "EMC" ("Electro Magnetic Compatibility") filters are used to reduce the "aggressivity" of an NFC device towards other victims, but not to reduce the "aggressivity" of other devices towards the NFC victim.

According to one embodiment, the aggressivity of any aggressor towards an NFC device which is then considered as the victim is reduced, regardless of whether this aggressor is located on the same chip as the NFC device or outside this chip.

NFC communications are based on an amplitude modulation. Thus, for example, as far as the transmission of information from a reader to a device comprising, for example, a tag or a device in card emulation mode is concerned, the amplitude modulation is supplied by the amplitude modulator of the reader.

Conversely, when information is transmitted from the tag or the device in card emulation mode, the amplitude modulation is obtained by a modulation of the load connected to the antenna of the tag or of the device in card emulation mode.

Consequently, the wanted signal (useful signal) is still located in the two side harmonics (to the left and right of the main harmonic which is centered on the carrier frequency). Furthermore, when the frequency of a noise originating from an aggressor is located in one of the side harmonics, it affects the wanted signal.

Thus, according to one embodiment of the invention, the noise emissions attacking the NFC victim are attenuated (in the frequency domain) by applying a dispersion, referred to as "dithering".

However, in order to avoid also attenuating the wanted signal, embodiments apply a synchronous dithering on the transmitter side and on the receiver side (reader and tag, for example).

The noise emissions are thus attenuated without attenuating the wanted signal. This results in a reduction in the energy of the frequency of the noise which is located in and contaminates the side harmonic containing the useful signal. The noise emission is consequently filtered without filtering the wanted signal.

According to one aspect, a method is proposed for contactless communication of information between a first device and a second device respectively having two antennas coupled via a near magnetic field.

The communication is advantageously a near field communication (NFC).

In one embodiment, within the first device (which then acts as a transmitter device), a digital data stream corresponding to the information to be transmitted is generated along with a first amplitude-modulated and dithered signal in the antenna of the first device from this stream and from an application of a first dithering. Within the second device (which then acts as a receiver device), a frequency transposition of a second amplitude-modulated and dithered signal originating from the first signal is performed, with application of a second dithering synchronous with the first dithering.

According to one embodiment, the application of the first dithering is implemented by a first circuit, and the application of the second dithering is implemented by a second circuit.

A particularly easy way of obtaining synchronous dithering comprises the use of two structurally identical circuits having identical initial states.

By way of example, it can be provided that each of the first and second circuits includes a pseudo-random binary sequence generator and a delay circuit configurable by the pseudo-random binary sequence. The delay circuit has an input to receive an input signal of the circuit and an output to deliver the dithered output signal.

Furthermore, the pseudo-random binary sequence generator may conventionally comprise a set of flip-flops. In this case, the initial states of the circuit comprise the initial values of the flip-flops.

According to one embodiment, the application of the second dithering (i.e., on reception) includes a generation of an initial clock signal, and an application of the second dithering to the initial clock signal in such a way as to obtain a dithered clock signal and the frequency transposition is then carried out by using the dithered clock signal as the frequency transposition signal.

On transmission, and notably when the first device is a tag or a cellular mobile telephone in card emulation mode, for example, the generation of the first modulated and dithered signal includes, according to one embodiment, the application of the first dithering to the digital data stream in such a way as to obtain a dithered stream and a modulation of the impedance of a load connected to the terminals of the antenna of the first device with the dithered stream.

On transmission, when the first device is, for example, a reader, the generation of the first modulated, dithered signal includes the application of the first dithering to a clock signal in such a way as to obtain a dithered clock signal, and a digital-to-analog conversion of the digital data stream by using the dithered clock signal as the conversion clock signal.

According to a different aspect, a system is proposed for contactless communication of information between a first device and a second device respectively having two antennas intended to be coupled via a near magnetic field. Within the first device, a transmit chain comprises circuitry to generate a digital data stream corresponding to the information to be transmitted and to generate a first amplitude-modulated and dithered signal in the antenna of the first device from this stream and from an application of a first dithering. Within the second device, a receive chain comprises circuitry to carry out a frequency transposition of a second amplitude-modulated and dithered signal originating from the first signal, with application of a second dithering synchronous with the first dithering.

According to one embodiment, a first circuit is configured to receive a first input signal and to implement the application of the first dithering to the first input signal in such a way as to deliver a first dithered output signal. The second device includes a second circuit configured to receive a second input signal and implement the application of the second dithering to the second input signal in such a way as to deliver a second dithered output signal.

According to one embodiment, the two circuits are structurally identical and have identical initial states.

According to one embodiment, second circuit includes a generator configured to generate an initial clock signal forming the input signal for the second circuit which then delivers a dithered clock signal as the dithered output signal. The second circuit also includes a frequency transposition stage having a signal input to receive the second amplitude-modulated and dithered signal and a transposition input to receive the dithered clock signal as the frequency transposition signal.

According to one embodiment, applicable, for example, when the device is a tag, the input of the first circuit is connected to the output of the first and second circuits include a modulator configured to carry out a modulation of the impedance of a load connected to the terminals of the antenna of the first device with the dithered output signal.

According to one embodiment, applicable, for example, when the device is a reader, the first device includes a clock signal generator, the input of the first circuit being connected to the output of the clock signal generator in such a way as to deliver a dithered clock signal, a digital-to-analog conversion stage having a signal input connected to the output of the first circuitry and a clock input connected to the output of the first circuit, and an amplitude modulation stage connected to the output of the digital-to-analog conversion stage.

Obviously, the second device may also include a transmit chain as defined above and the first device may also include a receive chain as defined above.

In other words, each of these two devices may be equipped with a transmit chain and a receive chain in such a way as to enable a two-way information exchange.

Each of the first and second devices may be an NFC device.

According to a different aspect, a contactless communication device is proposed having an antenna intended to be coupled via a near magnetic field to an antenna of another contactless communication device, including a transmit chain comprising a first circuit configured to generate a digital data stream corresponding to information to be transmitted and a second circuit configured to generate a first amplitude-modulated and dithered signal in the antenna from this stream and from an application of a first dithering.

According to one embodiment, the second circuit includes first circuitry configured to receive a first input signal and implement the application of the first dithering to the first input signal in such a way as to deliver a first dithered output signal.

According to one embodiment, when the device is, for example, a tag or a cellular mobile telephone in card emulation mode, the input of the first circuit is connected to the output of the first circuitry and the second circuitry include a modulator configured to carry out a modulation of the impedance of a load connected to the terminals of the antenna of the first device with the first dithered output signal.

According to one embodiment, when the device is, for example, a reader, the second circuit includes a clock signal generator, the input of the first circuit being connected to the output of the clock signal generator in such a way as to deliver a dithered clock signal, a digital conversion stage having a signal input connected to the output of the first circuitry and a clock input connected to the output of the first circuit, and an amplitude modulation stage connected to the output of the digital-to-analog conversion stage.

According to a different aspect, a contactless communication device is proposed having an antenna intended to be coupled via a near magnetic field to an antenna of another contactless communication device in which a first amplitude-modulated and dithered signal can be generated containing information to be transmitted. The device includes a receive chain comprising a processor configured to carry out a frequency transposition of a second amplitude-modulated and dithered signal, originating from the first signal, with application of a second dithering synchronous with a first dithering applied within the other device.

According to one embodiment, the processor includes a second circuit configured to receive a second input signal and implement the application of the second dithering to the second input signal in such a way as to deliver a second dithered output signal.

According to one embodiment, regardless of whether the device is, for example, a reader or a tag, the processor includes a generator configured to generate an initial clock signal forming the input signal for the second circuit delivering a dithered clock signal as the dithered output signal. The processor also includes a frequency transposition stage having a signal input to receive the second amplitude-modulated and dithered signal and a transposition input to receive the dithered clock signal as the frequency transposition signal.

BRIEF DESCRIPTION OF THE DRAWINGS

Other advantages and characteristics of the invention will become evident from the detailed description of embodiments, which are in no way limiting, and the attached drawings, in which.

DETAILED DESCRIPTION OF ILLUSTRATIVE EMBODIMENTS

Figure 1:
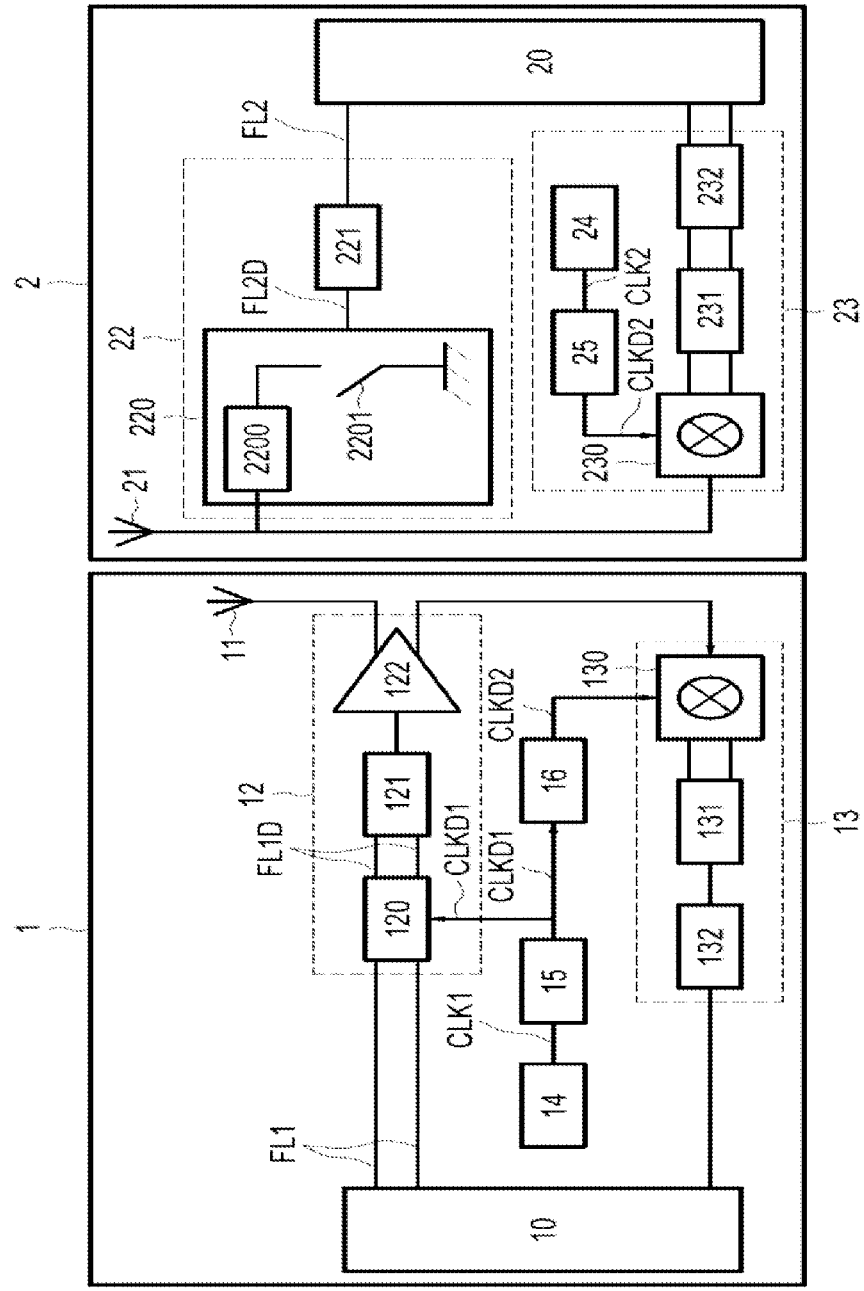
FIGS. 1 to 3 and 5 to 11 relate to embodiments of the invention.

In FIG. 1, the reference 1 denotes a reader, for example, but in a non-limiting manner, a cellular mobile telephone in card emulation mode or a conventional contactless chip card reader or a tag, such as a badge.

The reference 2 denotes a second device, for example a cellular mobile telephone in card emulation mode and, more generally, an electromagnetic transponder (tag), such as a label or badge.

These two devices, which are NFC devices, form a contactless communication system enabling an NFC communication between the two devices to be carried out.

In this respect, the reader 1 has an antenna 11 and the tag 2 has an antenna 21, these two antennas being intended to be coupled via a near magnetic field generated by the reader.

The reader 1 includes a transmit chain 12 connected between a digital processing module 10, for example a processor, and the antenna 11.

The transmit chain 12 comprises first circuitry, incorporated, for example, within the processor 10, configured to generate a digital data stream FL1 corresponding to the information to be transmitted to the tag 2. As is conventional in this respect, each information element of the stream FL1 comprises two coefficients intended to feed the two input channels (I and Q) of the modulator 121.

Following upward frequency transposition carried out in the modulator 121 and summation of the channels I and Q, the output signal of the modulator 121 is delivered to an amplifier 122 connected to the antenna 11.

The transmit chain 12 also comprises a digital-to-analog conversion stage 120 receiving at its input the stream FL1 and timed by a dithered clock signal CLKD1.

As will now be evident, the transmit chain of the reader comprises second circuitry configured to generate a first amplitude-modulated and dithered signal in the antenna 11 of the reader from this stream FL1 and from an application of a first dithering.

In this respect, the second circuitry includes a generator 14 configured to generate a clock signal CLK1 and a first circuit 15 configured to implement the application of the first dithering to the clock signal CLK1 in such a way as to deliver the dithered clock signal CLKD1.

By way of example, the frequency of the clock signal CLK1 and the dithered clock signal CLKD1 may be in the order of several hundred MHz.

In order to receive the information transmitted by the reader, the tag 2 comprises a receive chain 23 connected between the antenna 21 and a digital processing block 20, for example also a processor.

As will become evident below, this receive chain 23 comprises third circuitry configured to carry out a downward frequency transposition of a second amplitude-modulated and dithered signal, originating from the first amplitude-modulated and dithered signal (which is present in the antenna 12 of the reader), with application of a second dithering synchronous with the first dithering.

In this respect, the third circuitry includes a generator 24 configured to generate an initial clock signal CLK2 and a second circuit 25 structurally identical to the first circuit 15 and configured to deliver a dithered clock signal CLKD2.

In the case of an NFC transmission, the frequency of the clock signal CLK2 and the frequency of the dithered clock signal CLKD2 are typically equal to 13.56 MHz.

the third circuitry also comprises a frequency transposition stage 230 having a signal input connected to the antenna 21 and intended to carry out a downward frequency transposition of the second amplitude-modulated and dithered signal by using the dithered clock signal CLKD2 as the frequency transposition signal (oscillator signal).

Following frequency transposition, the signals present on the two channels I and Q undergo a conventional filtering treatment, notably in a module 231, then an analog-to-digital conversion in an analog-to-digital conversion stage 232.

The corresponding digital data are then processed by the processor 20.

In order to ensure that the two dithering operations carried out, on the one hand, on the reader side and, on the other hand, on the tag side, are synchronous, the two circuits 15 and 25 intended to implement these two dithering operations are, for example, structurally identical and have identical initial states.

Figure 2:
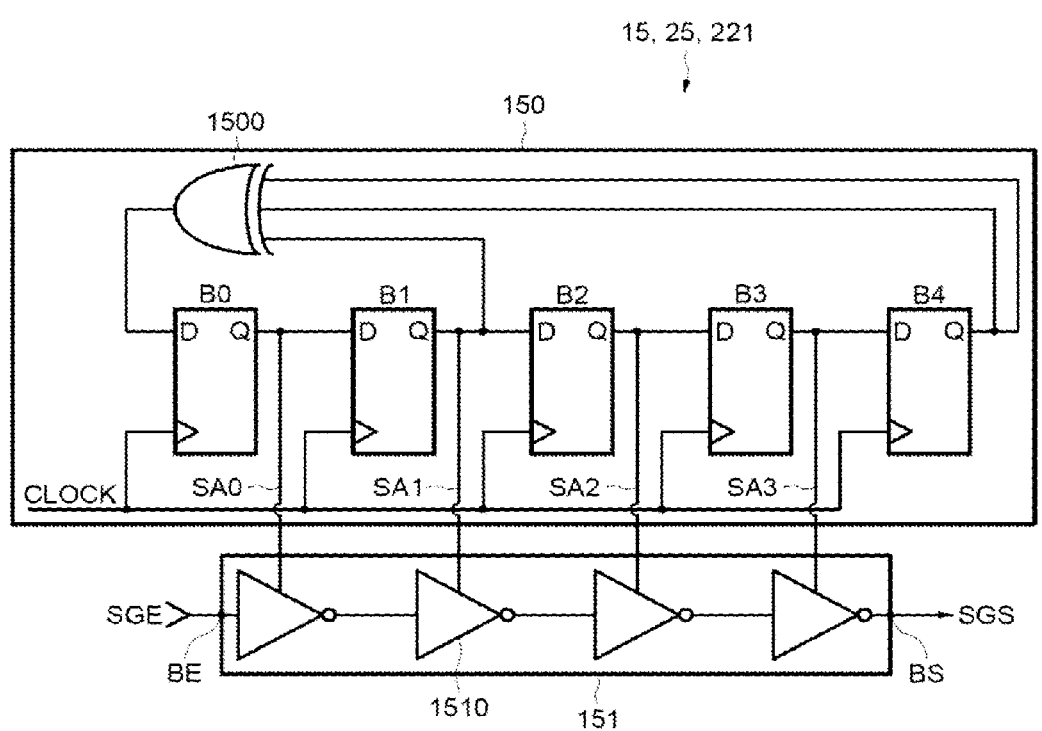

In this respect, it will be possible, for example, to use a circuit 15 and 25 of the type shown in FIG. 2.

More particularly, the circuit, 15, 25, comprises a generator 150 configured to generate a pseudo-random binary sequence. A generator of this type is known to the person skilled in the art by the acronym "PRBS (Pseudo Random Binary Sequence) generator."

It comprises a series of flip-flops D, here five chained flip-flops B0-B4, the outputs Q of some of which are connected to the inputs of an EXCLUSIVE OR logic gate 1500. The output of the logic gate 1500 is looped back onto the input D of the first flip-flop B0 of the chain.

Each flip-flop is controlled by a clock signal denoted CLOCK and each output Q of a flip-flop of the chain, except for the last, delivers a binary activation signal SA0-SA3.

The circuit 15, 25 furthermore includes delay circuitry 151, here comprising a chain of inverters 1510.

The input BE of the delay circuit is intended to receive an input signal SGE and the output BS of the chain is intended to deliver a dithered output signal SGS.

The delay circuitry 151 is configurable by the activation signals SA0-SA3. More precisely, each activation signal controls, for example, a multiplexer intended, according to the activation signal value, to short-circuit or not to short-circuit the corresponding inverter in the inverter chain.

The pseudo-random sequence SA0-SA3 thus allows the inverters of the chain to be short-circuited or not to be short-circuited in a pseudo-random manner in such a way as to obtain a pseudo-random delay, thus effectively providing a dithered signal at the output.

Here, the initial states of the circuit 15, 25 are the initial values of the flip-flops B0-B4.

Reference is now made more particularly to FIGS. 3 to 7 in order to illustrate a mode of operation of the system shown in FIG. 1 in the case of a communication from the reader 1 to the tag 2.

Figure 3:
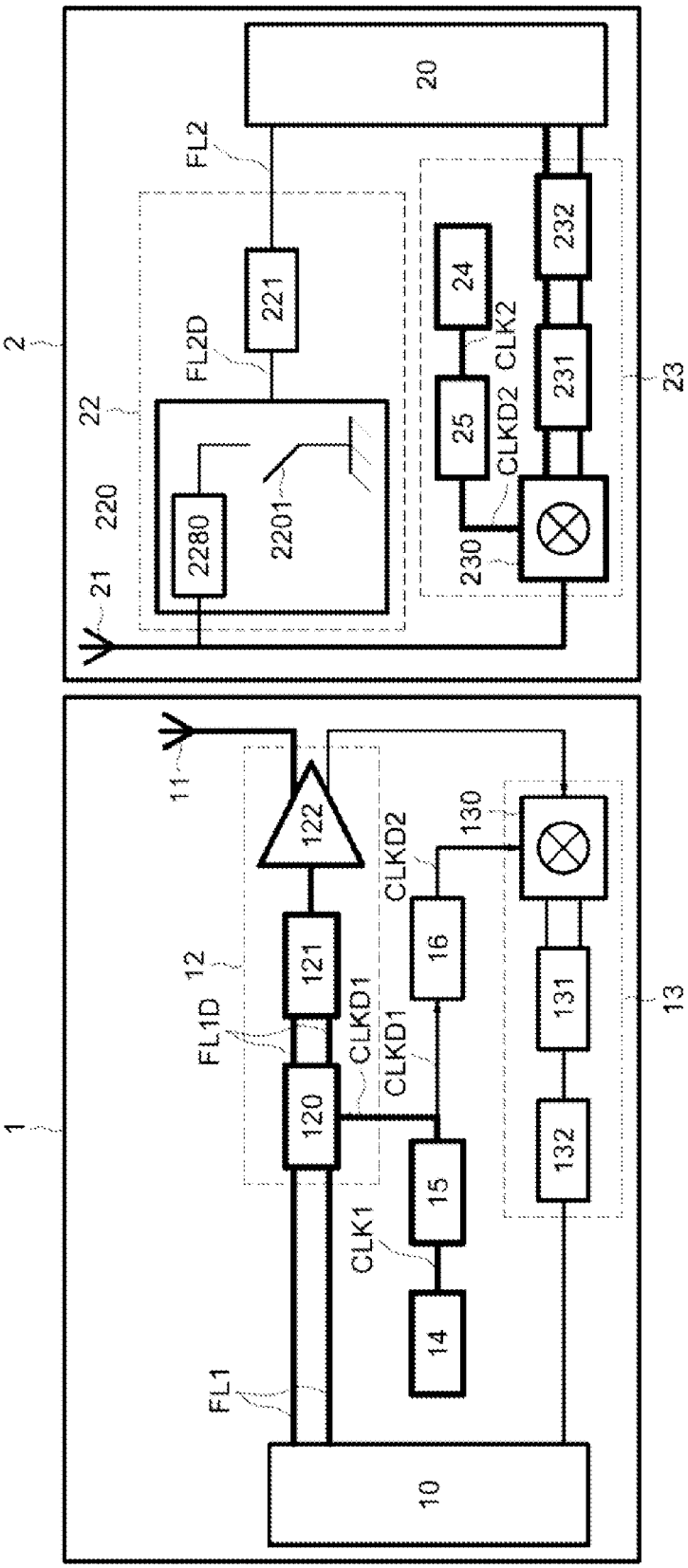

In FIG. 3, the bold lines show the different steps of the communication method and the different elements implemented in this mode of operation.

For the communication of information from the reader 1 to the tag 2, the reader 1 generates, in the antenna 11, via the transmit chain 12, an amplitude-modulated signal which will be communicated to the tag 2 via the magnetic coupling between the antennas 11 and 21.

Figure 4:
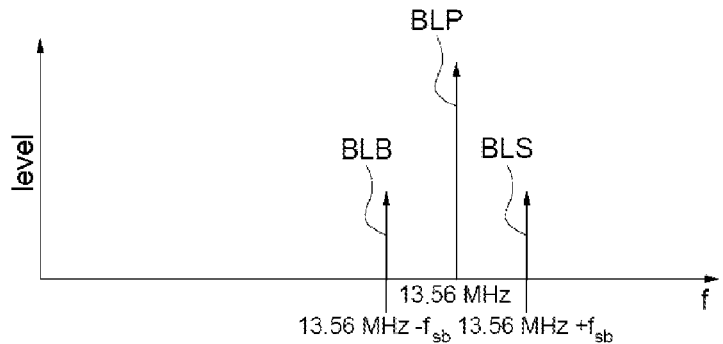
FIG. 4 relates to the prior art.
Figure 5:
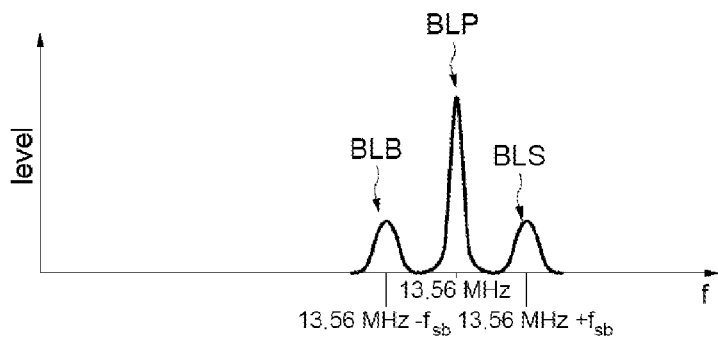

In the prior art, i.e., in the absence of dithering applied in the transmit chain, the signal which is communicated is, as shown in FIG. 4, an amplitude-modulated signal which comprises a main harmonic (carrier) centered on the frequency of 13.56 MHz and two side harmonics BLB and BLS centered on the frequency of 13.56 MHz–fsb and 13.56 MHz+fsb respectively.

Europay MasterCard Visa, or EMV for short, is an international security standard for payment cards of the chip card type, initiated by the EMVCo consortium. Most, if not all, chip bank cards comply with the EMV standard as do most, if not all, electronic payment terminals. The different documents bringing together the specifications of the EMV standard, in particular version 2.3 of November 2011, are available from the EMVCo consortium.

The communication protocol for the contactless EMV standard is based mainly on the protocol described in the ISO/IEC 14443 standard.

According to the EMVCO consortium and the ISO/IEC14443 standard, the value of fsb is equal to 106 kbit/s for a communication from the reader to the tag, and may be equal to 106, 212, 424 or 848 kbit/s for a communication from the tag to the reader.

A parasitic noise superimposed (in the frequency domain) on the sideband BLB could not be filtered since, in this case, the wanted signal, i.e., the transmitted information, would also be filtered.

For this reason, in order to lessen the impact of this noise on the communication, synchronous dithering is applied on the reader side and on the tag side.

More precisely, before the generation and transmission of the amplitude-modulated signal, the dithering is applied to the clock signal CLK1 in such a way as to obtain the dithered clock signal CLKD1, which is delivered to the digital-to-analog conversion stage 120.

The stream FL1D delivered by this digital-to-analog conversion stage is consequently dithered and the resulting amplitude-modulated signal which will be transmitted is also dithered. This signal is shown schematically in the frequency domain in FIG. 5. It should be noted that all the bands BLB, BLP, BLS have been spread.

Figure 6:
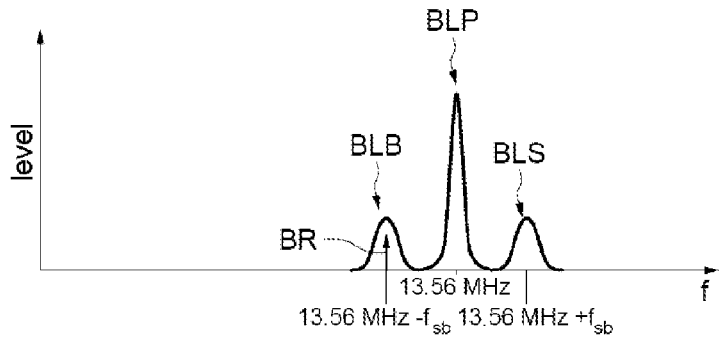

It is now assumed, as shown in FIG. 6, that the amplitude-modulated and dithered signal is subjected to a noise BR during transmission, this noise BR being located in the sideband BLB.

On reception, the amplitude-modulated, dithered and noisy signal received in the antenna 21 undergoes a downward frequency transposition in the transposition stage 230 by using the dithered clock signal CLKD2 as the oscillator signal.

Figure 7:
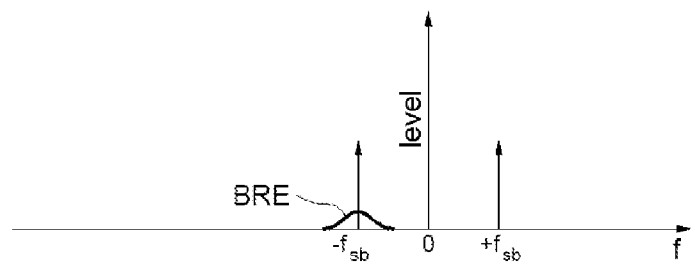
Figure 8:
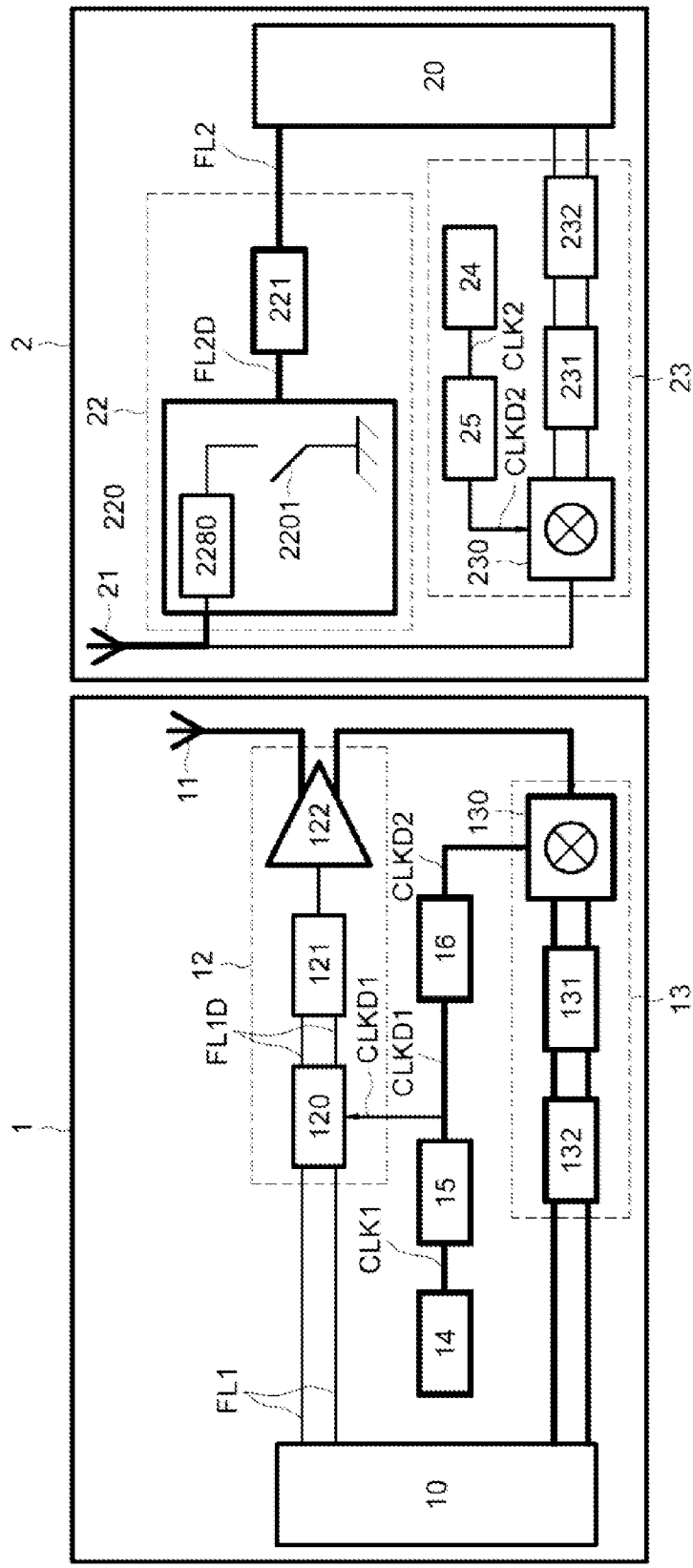

Since the two dithering operations applied respectively in the reader and in the tag are synchronous, the impact of this dithering is eliminated on the amplitude-modulated signal since the relative phases of the clock signals CLKD1 and CLKD2 used on transmission and on reception are constant. Moreover, the noise BR will then be dithered for the first time on reception only, i.e. in the tag 2. Consequently, as shown in FIG. 7, its spectrum is spread and the amplitude of this spread noise BRE is thus reduced. A noise attenuation has thus been carried out without the use of filtering.

Reference is now made more particularly to FIGS. 8 to 11 in order to illustrate a mode of operation of the system shown in FIG. 1 during a communication from the tag 2 to the reader 1.

In this respect, as shown in FIG. 1, the tag 2 also comprises a transmit chain 22 comprising a circuit 220 configured to apply a first dithering to an information stream FL2 delivered by the processor 20 and to be transmitted to the reader. The structure and initial states of the circuit 220 are similar to the structure and initial states of the circuit 15 and the circuit 25. The circuit 221 therefore delivers a dithered information stream FL2D.

The transmit chain 22 also comprises a circuit 220 comprising a load 2200 connected to the terminals of the antenna 21 via a controllable switch 2201. In practice, the antenna 21 comprises an inductive-capacitive resonant circuit and the circuit 220 will enable modification, via the switch 2201, of the impedance of the load connected to the terminals of the antenna of the object in such a way as to carry out a load modulation.

In order to carry out the transmission of the information from the tag 2 to the reader 1, the reader generates, via its antenna 12, a non-amplitude-modulated magnetic field which, in NFC communications, is a 13.56 MHz sine wave with amplitude of between 0.5 and 7.5 amperes per meter.

Conversely, the antenna 21 modulates the field generated by the reader. As shown above, this modulation is carried out by modifying the load connected to the terminals of the antenna 21. This results in a change in the amplitudes of the voltages and current present in the antennas 21 and 11.

A copy of this current flowing in the antenna 11 is generated in such a way as to inject it into the receive chain 13 of the reader where it is demodulated and processed in such a way as to extract the transmitted information.

This in fact also involves an amplitude-modulated signal since the load variation carried out during the load modulation by the circuit 220 results in an amplitude and phase modulation of the signal (current voltage) in the antenna 21 and in the antenna 11.

The receive chain 13 of the reader consequently comprises a downward frequency transposition stage 130 receiving, at its signal input, the copy of the current flowing in the antenna 11 and, at its transposition input, a dithered clock signal CLKD2 which serves as the transposition signal (oscillator signal).

In this respect, it can be assumed that the third circuitry of the receive chain configured to carry out the frequency transposition with application of a second dithering synchronous with the dithering carried out in the tag also includes the circuit 15 which supplies the dithered clock signal CLKD1, and also a frequency divider 16 which delivers the dithered clock signal CLKD2 having a frequency in the order of 13.56 MHz from the signal CLKD1 having a frequency in the order of several hundred MHz.

Following frequency transposition, the two channels I and Q are processed in a block 131 conventionally comprising notably filters, since the analog signals delivered by the block 131 are converted into digital information in an analog-to-digital conversion stage 132.

This digital information is sent to the processor 10 for processing.

Thus, in the absence of dithering carried out by the circuit 221 of the tag 2, the amplitude-modulated signal present in the antenna 21 and in the antenna 11 would present the spectrum shown in FIG. 4.

Figure 9:
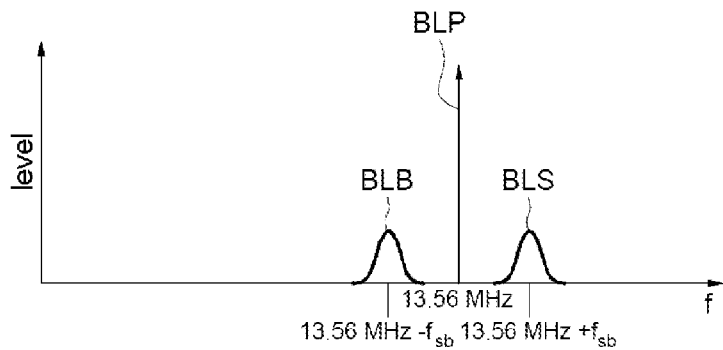
Figure 10:
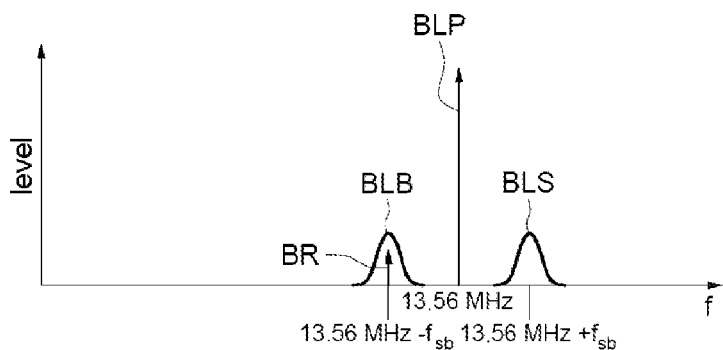

Conversely, since the load modulation carried out by the circuit 220 uses the dithered information stream FL2D to control the switch 2201, the frequency spectrum of the signal communicated to the reader is as shown in FIG. 9 in which the sidebands BLB and BLS have been spread.

It is then assumed once more that, during the communication, a noise BR is present (in the frequency domain) in the sideband BLB.

Figure 11:
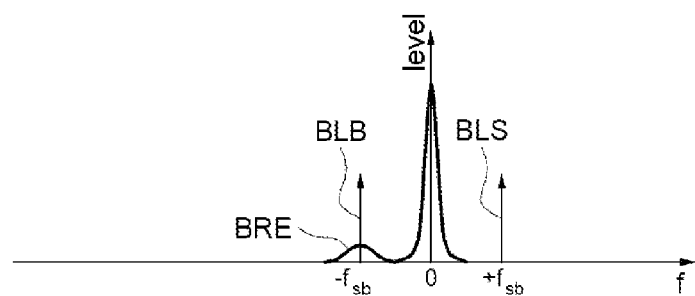

In the reader, which therefore acts as a receiver, the frequency transposition is then carried out with the dithered transposition signal CLKD2 and the spectrum of the transposed signal shown in FIG. 11 is then obtained.

The two synchronous dithering operations carried out in the tag and in the reader (receiver) respectively remove the impact of the dithering on the sidebands BLB and BLS since the relative phases of the signals FL2D and CLKD2 are constant. However, since the noise BR, and also the main harmonic BLP, are subjected to the dithering for the first time in the receiver, the spectrum BRE of the noise is spread along with the spectrum of the main harmonic.

Consequently, the noise level is again reduced and a noise attenuation has in fact been carried out without filtering.

By way of example, by using a circuit of the type shown in FIG. 2 as a dithering circuit, with a pseudo-random sequence having a length of 16 and a delay of 125 picoseconds, capable of being applied by each inverter, a noise reduction of 11.2 dB is obtained, corresponding to a reduction in the noise power by a factor of 10.

What is claimed is:

1. A method for contactless communication of information between a first device and a second device coupled via a near magnetic field, the first and second devices each having an antenna, the method comprising:

within the first device, generating a digital data stream corresponding to information to be transmitter and generating a first amplitude-modulated and dithered signal in the antenna of the first device from the digital data stream and from an application of a first dithering, the first dithering being performed by converting the digital data stream to analog data using a dithered clock signal so that samples of the digital data stream are taken with varying delays; and within the second device, performing a frequency transposition of a second amplitude-modulated and dithered signal originating from the first amplitude-modulated and dithered signal with application of a second dithering synchronous with the first dithering.

2. The method according to claim 1, wherein the application of the first dithering is implemented by a first circuit, and the application of the second dithering is implemented by a second circuit, the first and second circuits being structurally identical and having identical initial states so that the second dithering is synchronous with the first dithering.

3. The method according to claim 1, wherein the application of the second dithering comprises generating an initial clock signal and applying the second dithering to the initial clock signal in such a way as to obtain a dithered clock signal, the frequency transposition then being carried out by using the dithered clock signal as a frequency transposition signal.

4. The method according to claim 1, wherein generating the first modulated and dithered signal comprises applying the first dithering to the digital data stream in such a way as to obtain a dithered stream and a modulation of an impedance of a charge connected to terminals of the antenna of the first device with the dithered stream.

5. The method according to claim 1, wherein generating the first modulated and dithered signal comprises applying the first dithering to a clock signal in such a way as to obtain a dithered clock signal, and performing a digital-to-analog conversion of the digital data stream using the dithered clock signal as a conversion clock signal.

6. The method according to claim 1, wherein the contactless communication of information is a near field communication (NFC).

7. A system for contactless communication, the system comprising;

a first device comprising:
an antenna;
a transmit chain comprising first circuitry configured to generate a digital data stream corresponding to information to be transmitted and second circuitry configured to generate a first amplitude-modulated and dithered signal in the antenna of the first device by changing delays between samples from the digital data stream and from an application of a first dithering that is performed by converting the digital data stream to analog data using a dithered clock signal;

a second device comprising:
an antenna; and
a receive chain comprising third circuitry configured to carry out a frequency transposition of a second amplitude-modulated and dithered signal originating from the first amplitude-modulated and dithered signal by changing delays between samples with application of a second dithering synchronous with the first dithering.

8. The system according to claim 7, wherein the second circuitry comprises a first circuit configured to receive a first input signal and to implement the application of the first dithering to the first input signal in such a way as to deliver a first dithered output signal, and wherein the third circuitry comprises a second circuit configured to receive a second input signal and implement the application of the second dithering to the second input signal in such a way as to deliver a second dithered output signal.

9. The system according to claim 8, wherein the first and second circuits are structurally identical and have identical initial states so that the second dithering is synchronous with the first dithering.

10. The system according to claim 8, wherein the third circuitry comprises a clock signal generator configured to generate an initial clock signal forming the second input signal for the second circuit delivering a dithered clock signal as the second dithered output signal and a frequency transposition stage having a signal input to receive the second amplitude-modulated and dithered signal and a transposition input to receive the dithered clock signal as a frequency transposition signal.

11. The system according to claim 8, wherein an input of the first circuit is connected to an output of the first circuitry and wherein the second circuitry comprises a modulator configured to carry out a modulation of an impedance of a load connected to terminals of the antenna of the first device with the first dithered output signal.

12. The system according to claim 8, wherein the second circuitry comprises a clock signal generator having a clock signal output, an input of the first circuit being connected to an output of the clock signal generator in such a way as to deliver a dithered clock signal, and a digital-to-analog conversion stage having a signal input connected to an output of the first circuitry and a clock input connected to an output of the first circuit, and an amplitude modulation stage connected to an output of the digital-to-analog conversion stage.

13. The system according to claim 8, wherein the first and second circuits each comprise a pseudo-random binary sequence generator and a delay circuit configurable by the pseudo-random binary sequence generator, having an input to receive an input signal and an output to deliver a dithered output signal.

14. The system according to claim 7, wherein the second device also comprises a transmit chain and the first device also comprises a receive chain.

15. The system according to claim 7, wherein the first and second devices are both NFC devices.

16. The device according to claim 7, wherein the second circuitry comprises a first circuit configured to receive a first input signal and implement the application of the first dithering to the first input signal in such a way as to deliver a first dithered output signal;
wherein the first circuit comprises a pseudo-random binary sequence generator and a delay circuit configurable by the pseudo-random binary sequence generator;
wherein the delay circuit comprises a plurality of delay taps, each delay tap comprising a delay control input;
wherein the pseudo-random binary sequence generator comprises a plurality of pseudo-random number generator outputs; and
wherein each output of the plurality of pseudo-random number generator outputs is coupled to a respective one of the delay control inputs of the plurality of delay taps.

17. A contactless communication device comprising:
an antenna configured to be coupled via a near magnetic field to an antenna of an other contactless communication device;
a transmit chain comprising first circuitry configured to generate a digital data stream corresponding to information to be transmitted; and
second circuitry configured to use a first dithering to generate a first amplitude-modulated and dithered signal stream by converting the digital data into an analog signal using a dithered clock signal having a varying period and amplitude-modulating the analog signal.

18. The device according to claim 17, wherein the second circuitry comprises a first circuit configured to receive a first input signal and implement the application of the first dithering to the first input signal in such a way as to deliver a first dithered output signal.

19. The device according to claim 18, wherein an input of the first circuit is connected to an output of the first circuitry and wherein the second circuitry comprises a modulator configured to carry out a modulation of an impedance of a load connected to terminals of the antenna with the first dithered output signal.

20. The device according to claim 18, wherein the second circuitry comprises:
a clock signal generator, an input of the first circuit being connected to an output of the clock signal generator in such a way as to deliver the dithered clock signal;
a digital-to-analog conversion stage having a signal input connected to an output of the first circuitry and a clock input connected to an output of the first circuit; and
an amplitude modulation stage connected to an output of the digital-to-analog conversion stage.

21. The device according to claim 18, wherein the first circuit comprises a structure and initial states and the other contactless communication device comprises a structure and initial states that are identical to the structure and initial states of the first circuit.

22. The device according to claim 21, wherein the first circuit comprises a pseudo-random binary sequence generator and a delay circuit configurable by the pseudo-random binary sequence.

23. The device according to claim 22, wherein the delay circuit comprises a plurality of delay taps, each delay tap comprising a delay control input;
wherein the pseudo-random binary sequence generator comprises a plurality of pseudo-random number generator outputs;
wherein each output of the plurality of pseudo-random number generator outputs is coupled to a respective one of the delay control inputs of the plurality of delay taps; and
wherein the delay control input of each delay tap of the plurality of delay taps selects between bypassing the delay tap or not bypassing the delay tap.

24. The device according to claim 17, further comprising a receive chain comprising a processor configured to carry out a frequency transposition of a second amplitude-modulated and dithered signal, originating from the first amplitude-modulated and dithered signal, with application of a second dithering synchronous with a first dithering applied within the other device.

25. The device according to claim 17, wherein the device is an NFC device.

26. A contactless communication device comprising:
an antenna configured to be coupled via a near magnetic field to an antenna of an other contactless communication device, the antenna configured to receive first amplitude-modulated and dithered signal generated by the other contactless communication device; and a receive chain comprising a processor configured to carry out a frequency transposition of a second amplitude-modulated and dithered signal, originating from the first amplitude-modulated and dithered signal with application of a second dithering synchronous with a first dithering applied within the other device, the second dithering being performed by sampling the first amplitude-modulated and dithered signal and changing delays between samples.

27. The device according to claim 26, wherein the processor is configured to receive a second input signal and implement the application of the second dithering to the second input signal in such a way as to deliver a second dithered output signal.

28. The device according to claim 27, wherein the processor is configured to generate an initial clock signal used to deliver the second dithered output signal and wherein the processor is configured to receive the second amplitude-modulated and dithered signal and the second dithered output signal to carry out the frequency transposition.

29. The device according to claim 26, wherein the receive chain comprises a pseudo-random binary sequence generator and a delay circuit configurable by the pseudo-random binary sequence.

30. The device according to claim 26, further comprising a transmit chain comprising first circuitry configured to generate a digital data stream corresponding to information to be transmitted and second circuitry configured to generate a first amplitude-modulated and dithered signal.

31. The device according to claim 26, wherein the device is an NFC device.

32. A contactless communication device comprising:
an antenna;
a digital processing module;
a digital-to-analog converter within a data input coupled to the digital processing module;
a pseudo-random binary sequence generator with a clock input and a dithered clock output, the dithered clock output coupled to a clock input of the digital-to-analog converter;
a modulator with an input coupled to an output of the digital-to-analog converter; and
an amplifier with an input coupled to an output of the modulator and with an output coupled to the antenna.

33. The device according to claim 32, further comprising:
an analog-to-digital converter with an output coupled to the digital processing module;
a filter with an output coupled to an input of the analog-to-digital converter; and
a frequency transposition stage with an output coupled to the filter and it input coupled to the antenna.

* * * * *